US009141255B2

(12) United States Patent
Stroomer et al.

(10) Patent No.: US 9,141,255 B2
(45) Date of Patent: Sep. 22, 2015

(54) MOSAIC GENERATION FROM USER-CREATED CONTENT

(75) Inventors: Jeffrey D. Stroomer, Lafayette, CO (US); Jonathan B. Ballagh, Leesburg, VA (US); Roger B. Milne, Boulder, CO (US); Jeffrey C. Ward, Arvada, CO (US); Krista M. Marks, Boulder, CO (US); Thomas E. Fischaber, Boulder, CO (US)

(73) Assignee: Disney Enterprises, Inc., Burbank, CA (US)

( * ) Notice: Subject to any disclaimer, the term of this patent is extended or adjusted under 35 U.S.C. 154(b) by 538 days.

(21) Appl. No.: 12/974,346

(22) Filed: Dec. 21, 2010

(65) Prior Publication Data
US 2012/0159348 A1 Jun. 21, 2012

(51) Int. Cl.
*G06F 3/00* (2006.01)
*G06F 5/00* (2006.01)
*G06F 3/0481* (2013.01)

(52) U.S. Cl.
CPC .................................... *G06F 3/0481* (2013.01)

(58) Field of Classification Search
CPC .................................................... G06F 3/0481
USPC ......................................... 715/751; 345/635
See application file for complete search history.

(56) References Cited

U.S. PATENT DOCUMENTS

| 6,137,498 | A  | * | 10/2000 | Silvers ........................... 345/629 |
| 6,532,312 | B1 | * | 3/2003  | Corkran ......................... 382/284 |
| 6,629,097 | B1 | * | 9/2003  | Keith ..................................... 1/1 |
| 6,895,127 | B1 | * | 5/2005  | Zheng ............................ 382/294 |
| 7,012,623 | B1 | * | 3/2006  | Kusama et al. ................ 345/634 |
| 7,194,453 | B2 | * | 3/2007  | Yamamoto et al. .................. 1/1 |
| 7,242,799 | B1 | * | 7/2007  | Bremsteller ................... 382/162 |
| 7,711,183 | B2 | * | 5/2010  | Zheng ............................ 382/162 |
| 8,159,550 | B2 | * | 4/2012  | Paine et al. ................. 348/222.1 |
| 2005/0147322 | A1 | * | 7/2005 | Saed .............................. 382/284 |
| 2006/0181736 | A1 | * | 8/2006 | Quek et al. .................... 358/1.18 |
| 2007/0296824 | A1 | * | 12/2007 | Paine et al. ................. 348/222.1 |
| 2008/0133258 | A1 | * | 6/2008 | Kontogouris ...................... 705/1 |
| 2010/0277754 | A1 | * | 11/2010 | Arimura et al. ................. 358/1.9 |
| 2011/0058057 | A1 | * | 3/2011 | Tokunaga et al. .......... 348/222.1 |
| 2012/0054638 | A1 | * | 3/2012 | Ingoldby et al. .............. 715/751 |
| 2012/0110491 | A1 | * | 5/2012 | Cheung ......................... 715/771 |

* cited by examiner

*Primary Examiner* — Steven Sax
*Assistant Examiner* — Wilson Varga
(74) *Attorney, Agent, or Firm* — Patterson + Sheridan, LLP (57) ABSTRACT

Techniques for creating a mosaic using user-created content on a content sharing site. Embodiments of the invention may provide an interface on the content sharing site to allow users to create content. Embodiments may then determine a suitability value between the user-created content and portions of a mosaic, and insert the user-created content into a particular portion of the mosaic based on the determined suitability value for the particular portion.

18 Claims, 8 Drawing Sheets

MOSAIC GENERATION FROM USER-CREATED CONTENT

BACKGROUND

1. Field of the Invention

Embodiments of the invention relate to content sharing, and more particular, to generating a mosaic based on user-created content.

2. Description of the Related Art

Content sharing websites account for some of the most popular websites today. Generally, content sharing websites allow users to post content and share posted content with other users. For example, a user may upload a user-created video to a content sharing website, and then share the uploaded video with other users. Furthermore, a number of content sharing websites also allow users to create new content, which can then be shared with other users of the site. As an example, a content sharing website may enable users to create images using the website, and then share the created images with other users of the website.

Similar to other websites, content sharing websites have an interest in presenting content on their websites to users in an interesting way. One method of presenting a plurality of images is by building a mosaic using images from the content sharing website. Such mosaics may be created based on a reference image and in such a way that the completed mosaic resembles the reference image. For example, for a mosaic divided into a plurality of grid locations, each of the images used in the mosaic may occupy a portion of the grid. Images may then be inserted into the mosaic and arranged in such a way that the completed mosaic resembles the associated reference image.

SUMMARY

One embodiment of the invention includes a method for creating a mosaic based on a reference image from a plurality of user-created content. This method may generally include providing an interface on a content sharing site which is configured to allow users to interactively create content, and also include populating at least a portion of the mosaic with user-created content from the plurality of user-created content. The plurality of user-created content may be created using the interface. Populating at least a portion of the mosaic with user-created content may further include determining a suitability value between each of the user-created content in the plurality of user-created content and a corresponding portion of the reference image; and inserting a particular user-created content into the portion based on the determined suitability value for the particular user-created content.

Another embodiment of the invention includes a computer-readable storage medium containing a program that, when executed, performs an operation for creating a mosaic based on a reference image from a plurality of user-created content. The operation itself may generally include providing an interface on a content sharing site which is configured to allow users to interactively create content, and also include populating at least a portion of the mosaic with user-created content from the plurality of user-created content. The plurality of user-created content may be created using the interface. Populating the mosaic with user-created content may further include determining a suitability value between each of the user-created content in the plurality of user-created content and a corresponding portion of the reference image; and inserting a particular user-created content into the portion based on the determined suitability value for the particular user-created content.

Still another embodiment of the invention includes a system having a computer processor and a memory containing a program which, when executed on the computer processor, performs an operation for creating a mosaic based on a reference image from a plurality of user-created content. The operation itself may generally include providing an interface on a content sharing site which is configured to allow users to interactively create content and also include populating at least a portion of the mosaic with user-created content from the plurality of user-created content. The plurality of user-created content may be created using the interface. Populating at least a portion of the mosaic with user-created content may further include determining a suitability value between each of the user-created content and a corresponding portion of the reference image; and inserting a particular user-created content into the portion based on the determined suitability value for the particular user-created content.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Many content sharing websites have an interest in presenting content on their site in a way that is interesting to users. One such method for presenting content is by creating a mosaic composed using the content. For example, a content sharing site may allow users to create new content using the site, and may wish to share the user-created content using mosaics. Such a content sharing site may have a strong interest in including the user-created content on the site, so as to reward the user for taking the time and effort to create the content. Additionally, there may multiple arrangements of user-created content that create satisfactory mosaics for a particular reference image. However, the content sharing site may wish to only create one mosaic per reference image. Furthermore, for a content sharing site constructing multiple mosaics from user-created content, a particular piece of user-created content may match multiple portions of the reference images. In such a case, the content sharing site may wish to restrict how many times the particular piece of user-created content may be used in the mosaics, and how close the multiple instances of the content may be to each other.

However, because mosaics are often constructed based on reference images, the user-created content should be similar to at least one portion of a reference image in order to be included in a mosaic. As such, one potential drawback to this manner of presenting content is that it may be difficult to include all the user-created content in at least one mosaic on the content sharing site. For example, assume that a first user spends several hours on the content sharing website creating a detailed picture, but that the picture does not correspond to any portion of the reference images. In such an example, the content sharing site may be unable to find a close match for the user-created content in any of the mosaics created based on the reference images.

Embodiments of the invention provide techniques for creating a mosaic based on a reference image from a plurality of user-created images. Embodiments of the invention provide an interface configured to allow users to interactively create content to include in a larger mosaic generated from the user-created images. As content is received, the mosaic may be populated using the plurality of user-created images. In one embodiment, a software application managing the mosaic may calculate a suitability value between each user-created image and a corresponding portion of the reference image. Images may then be inserted into the mosaic based on the suitability value. By doing this, embodiments of the invention create a more visually appealing mosaic by populating each portion of the mosaic with an appropriate user-created image.

In one embodiment, a mosaic creation component may periodically generate portions of the mosaic by assigning various user-created content to tentative placements in the mosaic. Such a tentative position may then later be changed so as to move the user-created content to a different position in the mosaic, or to remove the user-created content from the mosaic altogether. As an example, the mosaic creation component may periodically (e.g., nightly) generate a portion of the mosaic by assigning tentative placements to various user-created images. Furthermore, by doing this over a period of time (e.g., several days), the mosaic creation component may create a complete mosaic that appears to evolve throughout the period of time.

Additionally, the mosaic creation component may alter the placements of the user-created images by modifying one or more parameters used to match the user-created images to portions of the reference image. For example, a first iteration of the mosaic may be generated by assigning the user-created content that best matches a portion of the reference image to a respective portion of the mosaic, while a second iteration of the mosaic may be generated by inserting the second best match into the mosaic. Continuing this example, a third iteration of the mosaic may be generated by adding the stipulation that a particular user-created image may only appear in the mosaic once. In each iteration, the resulting mosaic may have a very different visual appearance, even though each iteration is generated using the same set of user-created content. Advantageously, by doing this, embodiments may create an evolving mosaic by periodically generating an additional portion of the mosaic and by using different parameters through each iteration.

As a further advantage, such an evolving mosaic may be used in order to foster the growth of an online community around the content-sharing site. In one embodiment, the mosaic creation component may be configured to generate an additional portion of the mosaic periodically, and to give a preference to user content that was created earlier using the content-sharing site. By doing this, users are more likely to see their recently-created content featured in the mosaic, thus giving the users a sense of instant gratification for using the content-sharing site. Furthermore, as additional portions of the mosaic are generated on subsequent nights, users may see their content featured in other portions of the mosaic as the mosaic evolves over time. By doing this, embodiments create a better user-experience for the content sharing site, which may be used to promote the growth of an online community surrounding the site.

Additionally, embodiments of the invention may be configured to allow a user to specify a particular mosaic in which to insert content created by the user. In one embodiment, the user may specify a portion of the particular mosaic in which to insert the user-created content. In such a scenario, embodiments may generate initial canvas for the user, so as to improve the suitability value calculated between the specified portion of the mosaic and the content created by the user on the modified canvas. That is, the user may specify a region of the mosaic for which they would like to create content—and the system responds with a drawing canvas or template that should match well to the specified region. Doing so provide users with more control over which mosaic and which portion of the mosaic their content is used, while still maintaining the visually pleasing appearance of the mosaic.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications (e.g., a content creation application) or related data available in the cloud. For example, the content creation application could execute on a computing system in the cloud and allow users to dynamically create and share content in the cloud. In such a case, a mosaic creation component of the content creation application could compare the user-created content with portions of a reference image and generate a suitability value for each portion, which may be stored at a storage location in the cloud. The mosaic creation component may then insert the user-created content into a portion of a mosaic associated with the reference image, based on the generated suitability value. Doing so allows a user to submit content for inclusion in the mosaic from any computing system attached to a network connected to the cloud (e.g., the Internet).

Figure 1A:
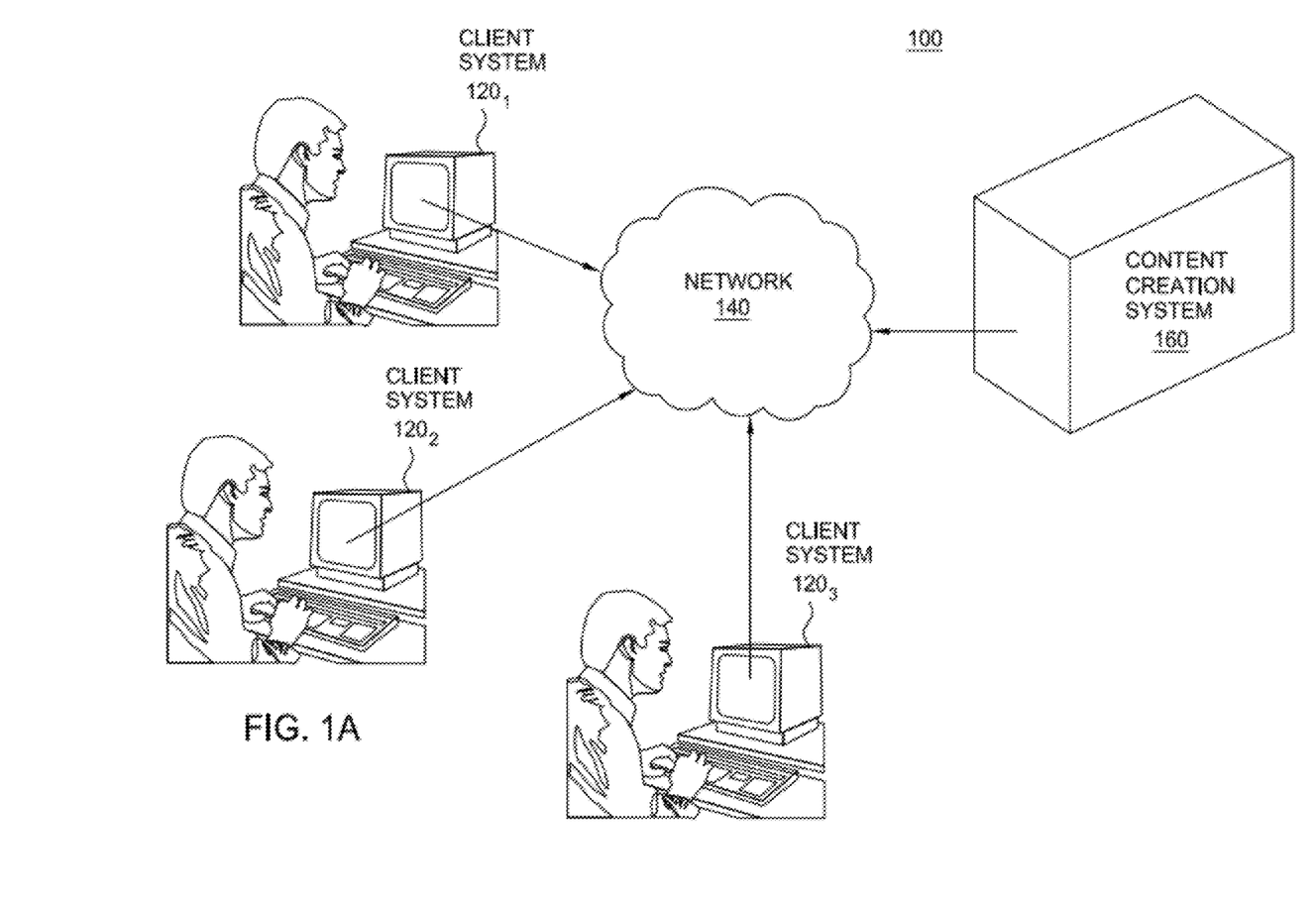
FIGS. 1A-1B illustrate networked systems configured to create a mosaic from user-created content, according to embodiments of the invention.
Figure 1B:
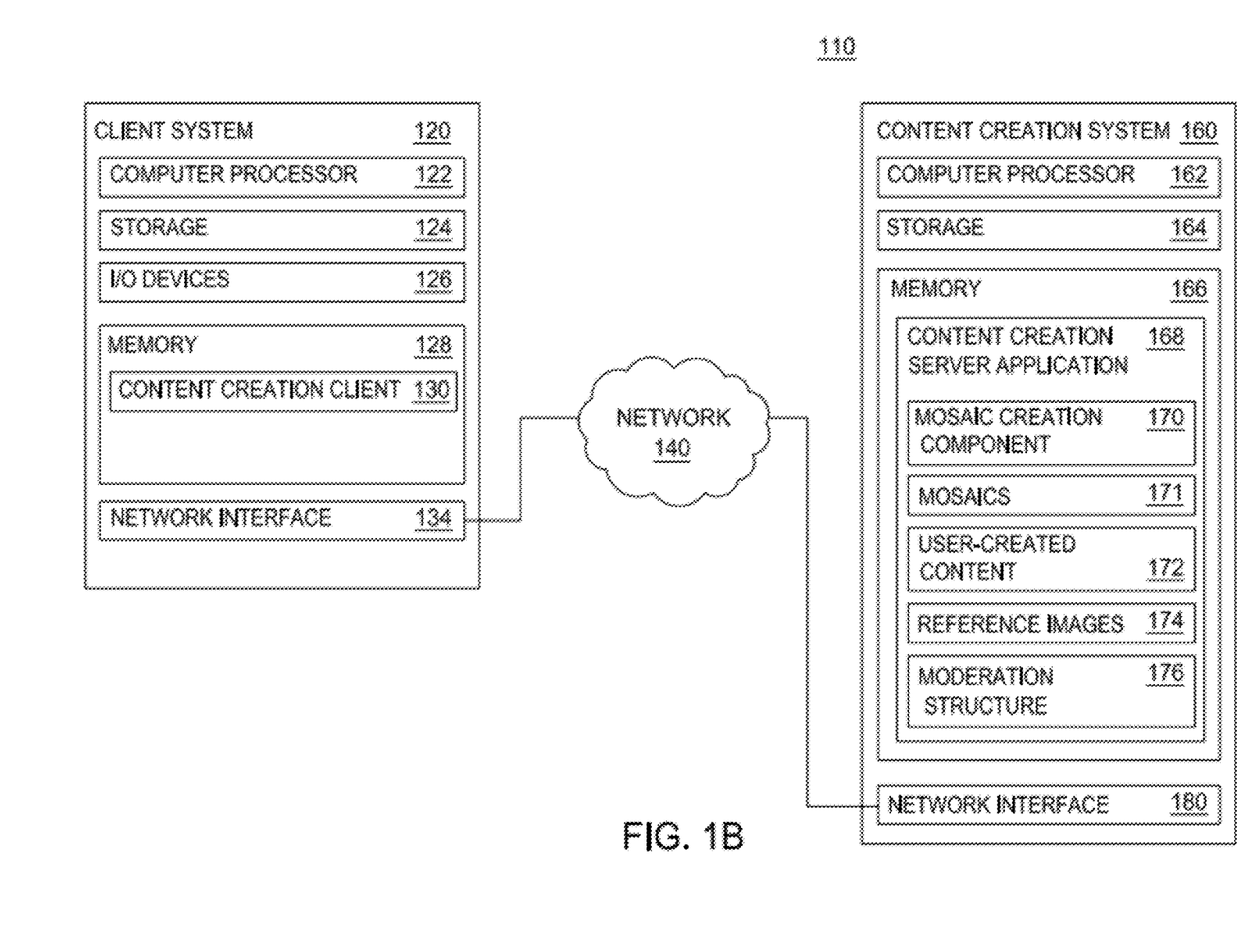

Referring now to the Figures, FIGS. 1A-1B illustrate networked systems configured to create a mosaic from user-created content, according to embodiments of the invention. More specifically, FIG. 1A shows a system 100 that includes three client systems $120_{1-3}$, a network 140 and a content creation system 160. The client systems $120_{1-3}$ may include a content creation client application and the content creation system 160 may host a content creation site. The client on the client systems $120_{1-3}$ may connect to a server application on the content creation system 160 using the network 140. The client may allow a user to interactively create and share content with other users connecting to the content creation system 160. Additionally, the content creation system 160 may include a mosaic creation component that may create mosaics using the user-created content.

Generally, users of the client systems $120_{1-3}$ may create or send content to the content creation system 160, where the content may then be shared with other users. For example, a first user of client system $120_1$ may create an image using the content creation client, and may then share the created image with a second user of client system $120_2$. The content creation site may also require submitted content to be approved before the content may be shared with other users. For example, a family-oriented content sharing site may wish to avoid sharing any adult-oriented or violent content. One method of evaluating content is by using human moderators to review submitted content before the content may be shared. The exemplary content creation site may place newly submitted content into a moderation structure (e.g., a queue), from which content may be retrieved for review. The content may then be retrieved from the moderation structure and reviewed by a moderator.

The mosaic creation component on the content creation system 160 may generally create a mosaic based on a reference image and composed of a plurality of user-created images. Once a user has created an image on the content sharing site using a content creation client application, the mosaic creation component may compare the user-created image against portions of the reference image to determine a suitability value between the two. In one embodiment, the mosaic creation component calculates a suitability value to represent the suitability. The mosaic creation component may then insert the user-created content into a portion of the mosaic based on the calculated suitability value. Advantageously, doing so may present the user-created content in an interesting manner on the content sharing site, by creating a visually appealing mosaic using the user-created content FIG. 1B is a block diagram of a networked system configured to create a mosaic from user-created content, according to one embodiment of the invention. As shown, the system 110 includes a client system 120 and a content creation system 160, both connected to the network 140. The client system 120 contains a computer processor 122, storage media 124, I/O devices 126, memory 128 and a network interface 134. Computer processor 122 may be any processor capable of performing the functions described herein. I/O devices 126 may represent a variety of input and output devices, including keyboards, mice, visual displays, printers and so on. The client system 120 may connect to the network 140 using the network interface 134. Furthermore, as will be understood by one of ordinary skill in the art, any computer system capable of performing the functions described herein may be used. Furthermore, although the depicted embodiment shows only a single client system connecting to the content creation system 160 via the network 140, this depiction is for illustrative purposes, and one of ordinary skill in the art will recognize that any number of client systems 120 may connect to any number of content creation systems 160.

In the pictured embodiment, memory 128 contains a content creation client 130. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The client 130 may generally connect to a content creation server. For example, according to one embodiment of the invention, the client 130 represents a web browser. Once connected to the server, the client 130 may display an interface for creating and viewing content (e.g., using one or more I/O devices 126, such as a monitor).

The content creation system 160 contains a computer processor 162, storage media 164, memory 166 and a network interface 180. Computer processor 162 may be any processor capable of performing the functions described herein. The content creation system 160 may connect to the network 140 using the network interface 180. Furthermore, as will be understood by one of ordinary skill in the art, any computer system capable of performing the functions described herein may be used. Additionally, although memory 166 is shown as a single entity, memory 128 may include one or more memory devices having blocks of memory associated with physical addresses, such as random access memory (RAM), read only memory (ROM), flash memory or other types of volatile and/or non-volatile memory.

In the pictured embodiment, memory 166 contains a content creation server application 168. The server application 168 contains a mosaic creation component 170, mosaics 171, user created content 172, reference images 174 and a moderation structure 176. The mosaic creation component 170 generally creates mosaics 171 based on a reference image 174 using the user-created content 172. Generally, the moderation structure 172 contains content for review by a moderator, an editor, or both, of the content sharing site. For example, the moderation structure 172 may contain user-created content 172 that has been created but has not yet been approved for sharing. Further, an editor may then review the potential placements and select the most visually appealing placement for the user-created image. The editor's choice may involve factors besides aesthetics. For example, editors may reject content to lower the rate at which a mosaic is being filled.

Generally, users interact with the content creation client 130 to connect to the content creation server application 168, which allows the user to create and submit content. Once the user content 172 is created, the mosaic creation component 170 may determine a position in a mosaic 171 to insert the user-created content 172. As discussed above, the mosaic 171 may be based on a reference image 174. The mosaic creation component 170 may compare the user-created content 172 and with portions of a reference image 174 to determine a suitability between the two. The mosaic creation component 170 may then insert the user-created image into the mosaic at a position determined based on the determined suitability.

In one embodiment of the present invention, the mosaic creation component 170 may delay the insertion of the user-created image into the mosaic for a period of time. For instance, the mosaic creation component 170 may be configured to determine a plurality of matches between user-created images and portions of the mosaic as a batch operation, and may then periodically insert a portion of the determined matches into the mosaic at later points in time. For example, the mosaic creation component 170 may determine a substantial number of matches between user-created images and portions of a reference image 174 during the night, when activity on the content sharing site is low, and may then insert the user-created images into corresponding portions of the mosaic periodically throughout the following day. By doing this, embodiments of the invention may give the appearance that the mosaic is created in real-time, even though a majority of the processing is performed as a batch operation. Additionally, such a configuration creates a more interesting and visually appealing mosaic to users of the content sharing site, as the mosaic will appear to grow and evolve throughout the day as more user-created content is inserted into the mosaic.

Furthermore, in one embodiment, the mosaic creation component 170 is configured to tentatively insert user-created images into the mosaic. In such an embodiment, the mosaic creation component 170 may reevaluate the insertion of a particular user-created image into a portion of the mosaic at a later point in time. For example, the mosaic creation component 170 may be configured to generate a portion of the mosaic nightly using different placement parameters or a different set of user-created images (e.g., a set including the images generated on that day using the content sharing site), thus allowing a complete mosaic to evolve over a period of days. If the mosaic creation component 170 then determines a second user-created image is a better match for the portion of the mosaic (e.g., the second user-created image may be more similar to the corresponding portion of the reference image 174), the mosaic creation component 170 may replace the tentatively inserted image with the second user-created image. Advantageously, by doing this, embodiments of the invention may create a more visually pleasing and interesting mosaic. However, such an example is for illustrative purposes only and without limitation, and one of ordinary skill will quickly recognize that parameters other than which image best matches the portion of the reference image may be used.

In one embodiment, the mosaic creation component 170 may also calculate an effort value for the user-created content. Generally, user-created content for which the user expended more effort will be of a higher quality than user-created content created using little effort. Such an effort value may take into account, for example, a number of brushstrokes used to create the content, time the user spent creating the content, how many times the user edited the content, and so on. The mosaic creation component 170 may then use the calculated effort value in determining where and when to place user-created images into the mosaic. As an example, the mosaic creation component 170 may be configured to give a preference to user-created images having a higher effort value (i.e., the user expended more effort in creating the image). Advantageously, by doing this, embodiments may effectively reward users for expending more effort in creating content on the content sharing site, which may stimulate the growth of the content sharing site by encouraging users to spend more time creating content on the site, and may improve the overall quality of the user-created content featured in the mosaic as well.

Although the mosaic creation component 170 may create mosaics 171 based on similarities between the user-created images 172 and the reference images 174, it can be difficult to calculate which permutation of user-created images 172 will produce the most visually appealing mosaic 171. Accordingly, in one embodiment, the mosaic creation component 170 is configured to generate multiple different mosaics 171 for a particular reference image 174, and to insert these multiple mosaics 171 into the moderation structure 176. An editor of the content sharing site may then review the multiple mosaics 171 in the moderation structure 176, and choose the most suitable mosaic(s) 171 for sharing on the site. This choice may be based on visual appeal, but can involve other factors (e.g., the rate at which the mosaic is being filled). Additionally, in one embodiment, the mosaic creation component 170 may present the editor with suggested replacements for tentatively inserted images in the mosaic. In such an embodiment, the editor may then select whether to keep the tentatively inserted image in the portion of the mosaic, or whether to replace it with a second user-created image. Furthermore, in one embodiment, a moderator may also review the user-created content to identify any inappropriate content. In such an embodiment, any content marked as inappropriate by the moderator may then be removed from the mosaic and from consideration for placement in future mosaics. Content may be deemed inappropriate because it is offensive, but for other reasons as well (e.g., if the content is protected by another entity's copyright).

In one embodiment, the mosaic creation component 170 is configured to generate the mosaic 171 a portion at a time. As an example, assume that a particular mosaic is divided into a 10×10 grid. In such an example, the mosaic creation component 170 may be configured to insert 10 images into portions of the mosaic each night, and may continue to do this until the mosaic 171 is complete. Advantageously, such an embodiment creates a mosaic 171 that appears to grow and evolve over time, which may in turn create a more interesting user experience. Furthermore, in such an example, the mosaic creation component 170 may insert the content into randomly-selected portions of the mosaic 171 each night. Alternatively, the mosaic creation component 170 may be configured to insert the content into portions of the mosaic 171 adjacent to portions where user-created content has already been inserted. In this latter embodiment, the mosaic 171 may appear to grow similar to a jigsaw puzzle. Of course, such examples are for illustrative purposes only, and generally any algorithm consistent with the functions described herein may be used instead.

Generally, when a user creates content to include in a mosaic, the content sharing site has an incentive to include the content in at least one mosaic in order to reward the user for creating the content. In order to create a visually pleasing mosaic that resembles a particular reference image, the mosaic creation component 170 may insert images into the mosaic that have a degree of suitability with a corresponding portion of the reference image. For example, for a portion of the mosaic that corresponds to a mostly red portion of the reference image, the mosaic creation component may select a user-created image that is also mostly red in color. However, since mosaics on the content sharing site may be based on a limited number of reference images, not all user-created content may be similar to a portion of a reference image. As such, it can be difficult for the content sharing site to incorporate all user-created content into at least one of the mosaics.

Accordingly, in one embodiment of the invention, the content creation site may be configured to assist users in creating content so as to increase the likelihood content created by the user will be included in a mosaic on the content sharing site. For instance, the mosaic creation component 170 may be configured to identify an available portion of the mosaic (e.g., a portion where no user-created image is currently inserted). The mosaic creation component 170 may then determine various characteristics of a portion of the reference image that corresponds to the available portion of the mosaic. For example, the mosaic creation component 170 may determine that the corresponding portion of the reference image has a blue background color. The mosaic creation component 170 may then modify an initial canvas of a content creation page of the content sharing site to have a blue background. By doing this, embodiments of the invention improve the likelihood that content created by the user using the modified canvas will be inserted into the mosaic. Additionally, embodiments improve the likelihood in a way that gives the user complete control over the creation of the content.

Figure 2A:
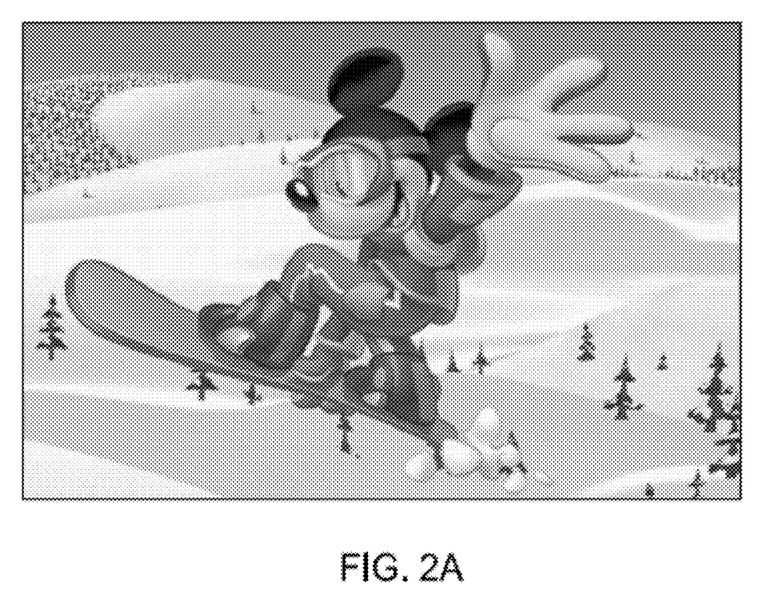
FIGS. 2A-2C are screenshots of exemplary content on a content-sharing site, according to embodiments of the invention.
Figure 2B:
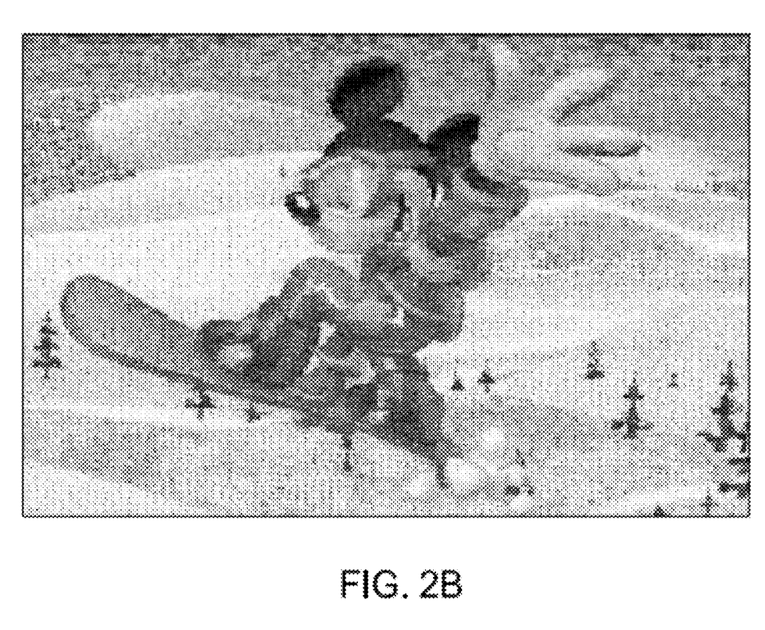

FIGS. 2A-2C are screenshots of example content for a content-sharing site, according to embodiments of the present invention. As shown, FIG. 2A shows a reference image 174. As discussed above, the reference image 174 may be used be the basis for one of the mosaics 171 on the content sharing site. More particularly, the mosaic creation component 170 may create a mosaic 171 based on the reference image 174 using user-created content 172, such that the completed mosaic 171 resembles the corresponding reference image 174. FIG. 2B shows an exemplary completed mosaic based on the reference image shown in FIG. 2A, according to one embodiment of the invention. Although the depicted mosaic resembles the corresponding reference image of FIG. 2A, the mosaic is created by assembling a plurality of user-created images.

Figure 2C:
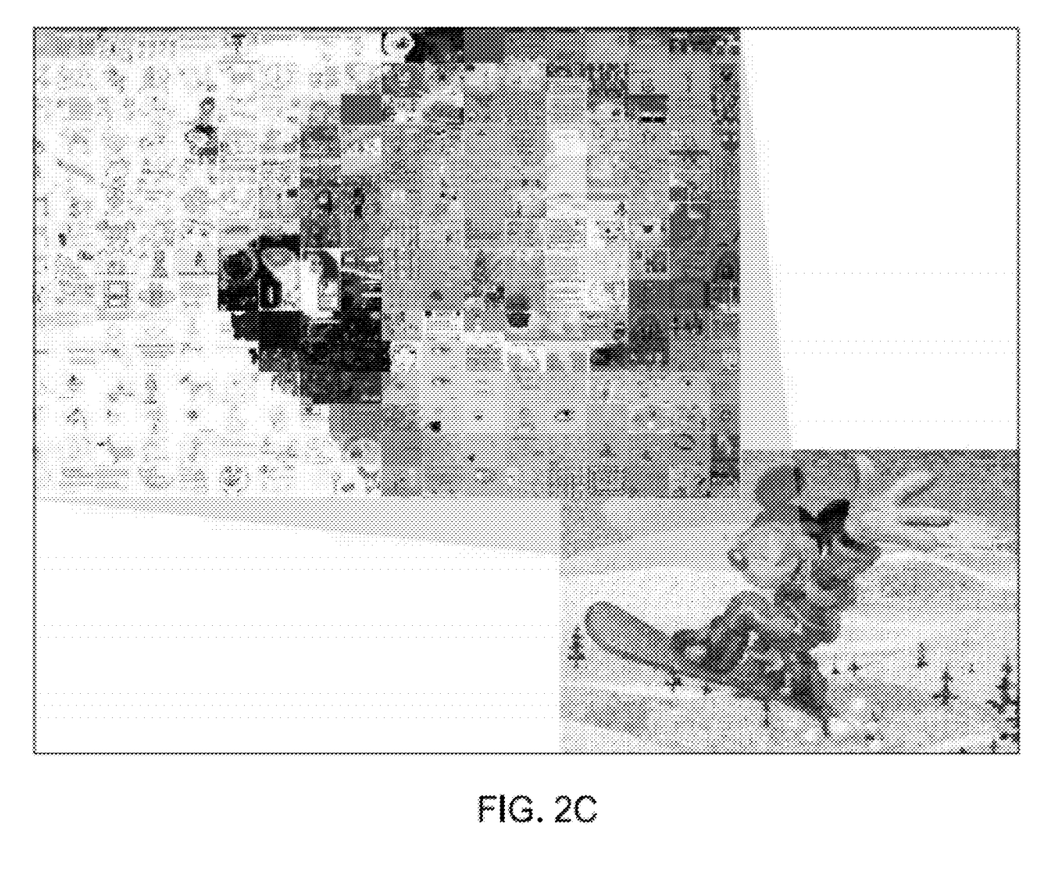

Although the user-created content used to compose the depicted mosaic are shown as very small in size, each of the user-created images used to create the depicted mosaic may be viewed individually when the mosaic is magnified. FIG. 2C shows a magnification of the mosaic of FIG. 2B, according to one embodiment of the present invention. As shown, the mosaic is composed using a plurality of small rectangles, with each rectangle depicting a single user-created image submitted to the content creation site. One advantage to using such mosaics is that users may view the user-created content in a more interesting way. For instance, one interesting characteristic of the depicted mosaic is that the image changes dramatically when viewed at different magnifications. For example, when a user views the mosaic at a high magnification, the user may see a single user-created image. As a second example, when the user views the mosaic at a low magnification, the user may see an image resembling the corresponding reference image. Advantageously, by presenting the user-created content in an interesting way, embodiments of the invention may improve the overall look and feel of the content sharing site.

Figure 3A:
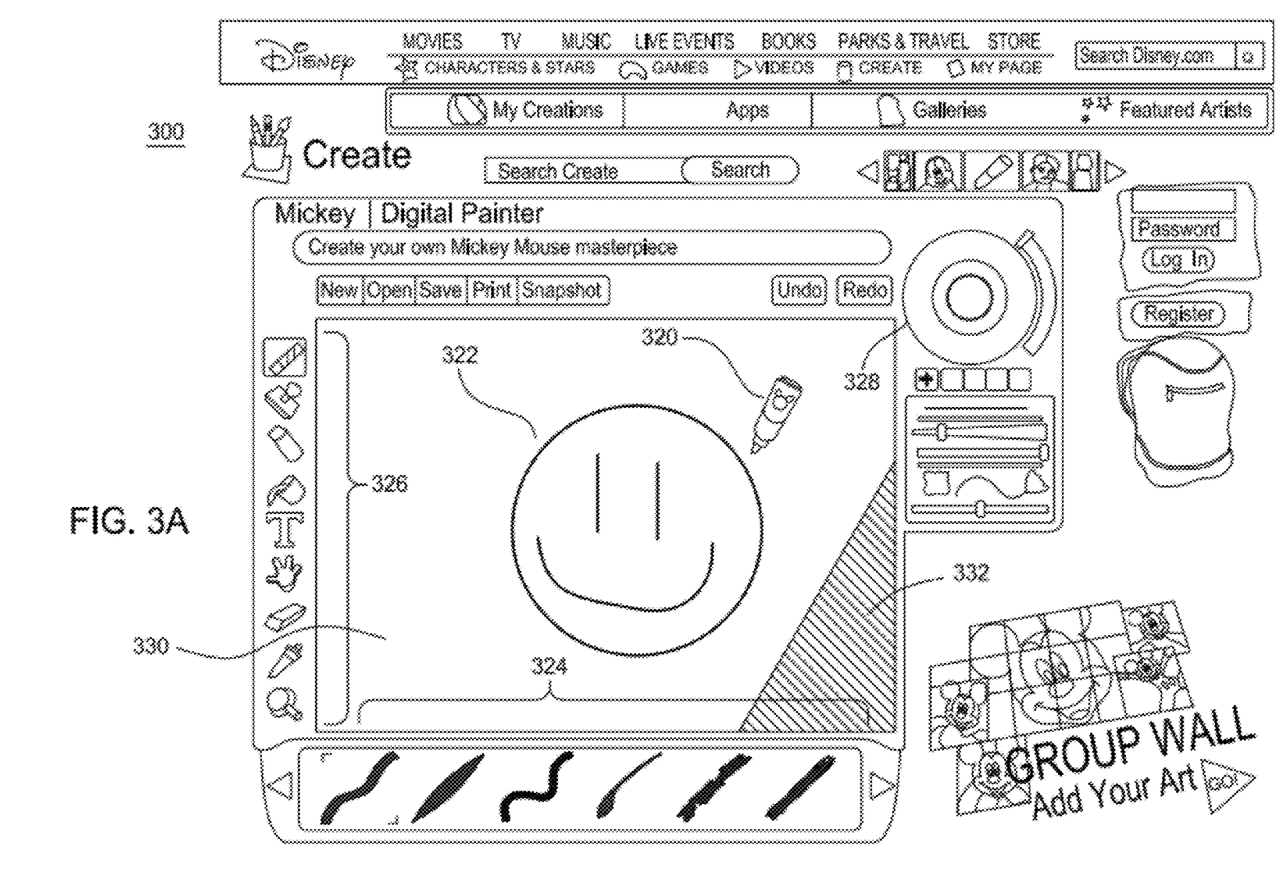
FIGS. 3A-3B are screenshots of an exemplary content-sharing site, according to embodiments of the invention.
Figure 3B:
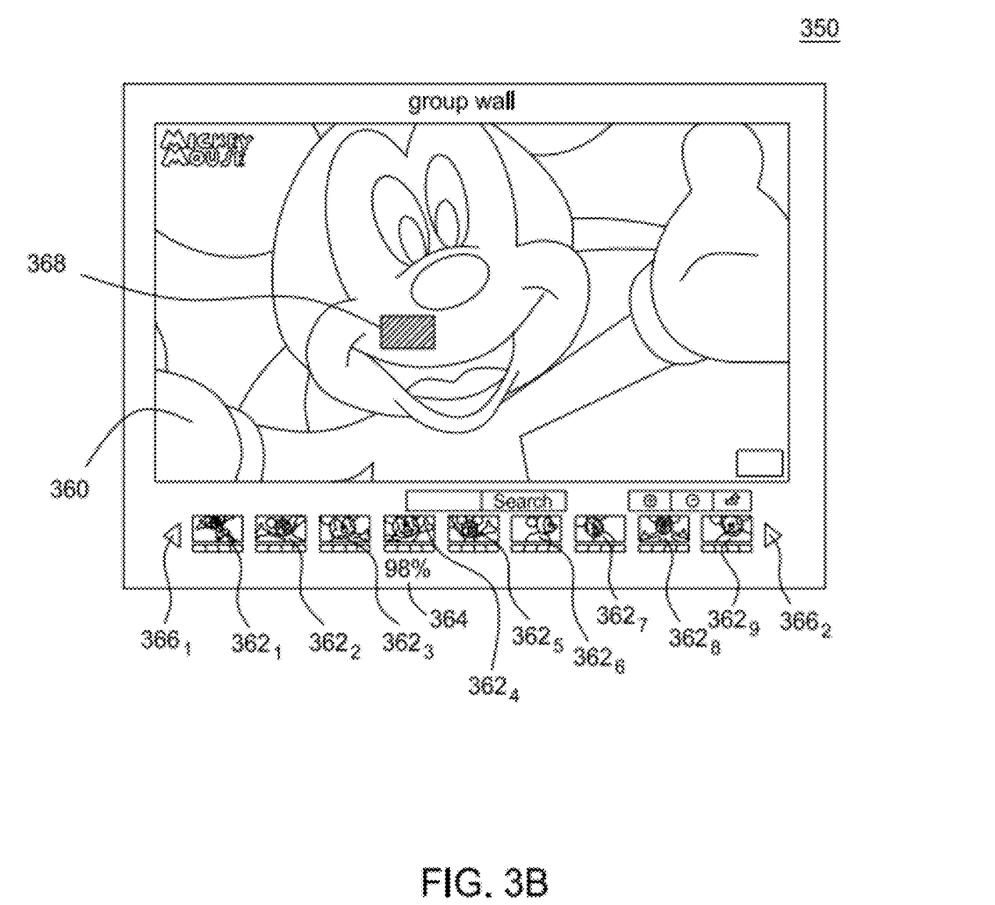

FIGS. 3A-3B are screenshots of an exemplary content-sharing site, according to embodiments of the invention. More particularly, FIG. 3A is a screenshot 300 of a content creation page of a content sharing site, according to one embodiment of the invention. As shown, the content creation page includes a cursor 320, an image 322, a plurality of line types 324, a plurality of tools 326 and a color selector 328. Generally, the user may use the cursor 320 to select a line type 324 and a color (e.g., using the color selector 328). The user may then use the cursor 320 to create the image 322. Additionally, the tools 326 allow the user to perform other actions, such as inserting stamps (i.e., predefined images) or text into the image 322. As discussed above, the mosaic creation component 170 may monitor the actions of a user creating content using the content creation page, and may calculate an effort value based on the user's actions. For instance, the mosaic creation component 170 may monitor a number of brushstrokes, the time the user spent using the content creation page, and a number of modifications the user made to the image using the content creation page. Such an effort value may then be used in placing content into the mosaic (e.g., by giving a preference to content where the user expended more effort).

The content creation page also includes a background color 330 for the image 322. As discussed above, the mosaic creation component 170 may modify an initial canvas of the content creation page in a way that increases the likelihood an image created using the canvas will be inserted in a particular region of the mosaic. For example, assume a particular mosaic has one available region where a user-created image has not yet been inserted. Further assume that the available portion is generally red in color. In such an example, the mosaic creation component 170 may modify the background 330 of the initial canvas of the content creation page to be red. Thus, when the user first accesses the content creation page, the content creation page will open with a blank initial canvas and a red background, which the user may then use to create an image.

Additionally, in one embodiment of the invention, the mosaic creation component 170 may be configured to modify the background color of various portions of the initial canvas, based on respective portions of the reference image. For example, assume an available portion of the mosaic corresponds to a portion of the reference image where the left side of the portion is red, and the right side of the portion is blue. In such an example, the mosaic creation component 170 may modify a left portion of the initial canvas to have a red background color, and a right portion of the initial canvas to have a blue background color. Of course, such an example is for illustrative purposes only, and one of ordinary skill in the art will quickly recognize that any number of portions and background colors may be used instead.

Furthermore, the depicted content creation page includes a background object 332. In addition to setting a background color 330 of the canvas, the mosaic creation component 170 may be configured to modify the initial canvas of the content creation page by inserting one or more background objects 332. For purposes of the following example, assume the mosaic creation component 170 is modifying the initial canvas so as to increase the likelihood an image created using the canvas will be inserted into a particular available portion of the mosaic. Continuing the example, the mosaic creation component 170 may determine that the majority of a portion of the reference image associated with the available portion of the mosaic has a white background color, but that there is a blue object in the lower right side of the portion. As such, the mosaic creation component 170 may modify the initial canvas of the content creation page by inserting the blue object 332 into the lower portion of the canvas.

Advantageously, modifying the initial canvas of the content creation page, increases the likelihood content created by the user will be included in the mosaic. In addition, embodiments increase this likelihood without modifying the user-content after it has been created, which may be upsetting to the user. In contrast, adjusting the initial background color 330 of the initial canvas, or inserting background objects 332 into the initial canvas, may encourage creativity in the user, who may feel challenged to create an image 322 using the modified initial canvas as a starting point. Additionally, embodiments of the invention may allow the user to change the background color 330 during the creation of the content, although such a change may well alter the likelihood that the user-created content will be included in a particular region the mosaic. Of course, such changes may result in user generated content that matches other regions of the mosaic.

FIG. 3B shows a mosaic selection screen of a content sharing site, according to one embodiment of the present invention. As shown, the screenshot 350 shows a selected mosaic 360, a plurality of mosaics $362_{1-9}$, a completeness value 364, scrolling buttons $366_{1-2}$ and an available grid location 368. As discussed earlier, the selected mosaic 360 and each of the other mosaics $362_{1-9}$ are created using user-created content 172. Additionally, each of the mosaics 360 and $362_{1-9}$ may be created based on a particular reference image 174. Generally, a user may use the mosaic selection screen to view different mosaics on the content sharing site. The user may use the scroll buttons $366_{1-2}$ to pan through the mosaics $362_{1-9}$. Upon selecting a particular one of the other mosaics $362_{1-9}$, a larger version of the selected mosaic may be displayed (e.g., the selected mosaic 360).

In the depicted example, the user has selected mosaic $362_4$, and accordingly an enlarged version of the mosaic $362_4$ is displayed as the selected mosaic 360. As shown, the completeness value 364 for the particular mosaic is 98%, indicating that the vast majority of the portions of the mosaic are already filled with user-created content. Additionally, the screenshot 350 shows one available portion 368 in the selected mosaic 360, which has not yet been filled with user-created content. Upon selecting the available portion 368 of the mosaic 360, a content creation page (such as the content creation page shown in FIG. 3A) may be displayed to the user. Additionally, in one embodiment, the mosaic creation component 170 may alter the initial canvas of the content creation page to reflect a portion of a reference image associated with the mosaic 360. Thus, for example, if the portion of the reference image has a yellow background color, the mosaic creation component 170 may alter the initial canvas of the content creation page to also have a yellow background color, in order to increase the likelihood the user-created content will be inserted into the mosaic 360.

Figure 4:
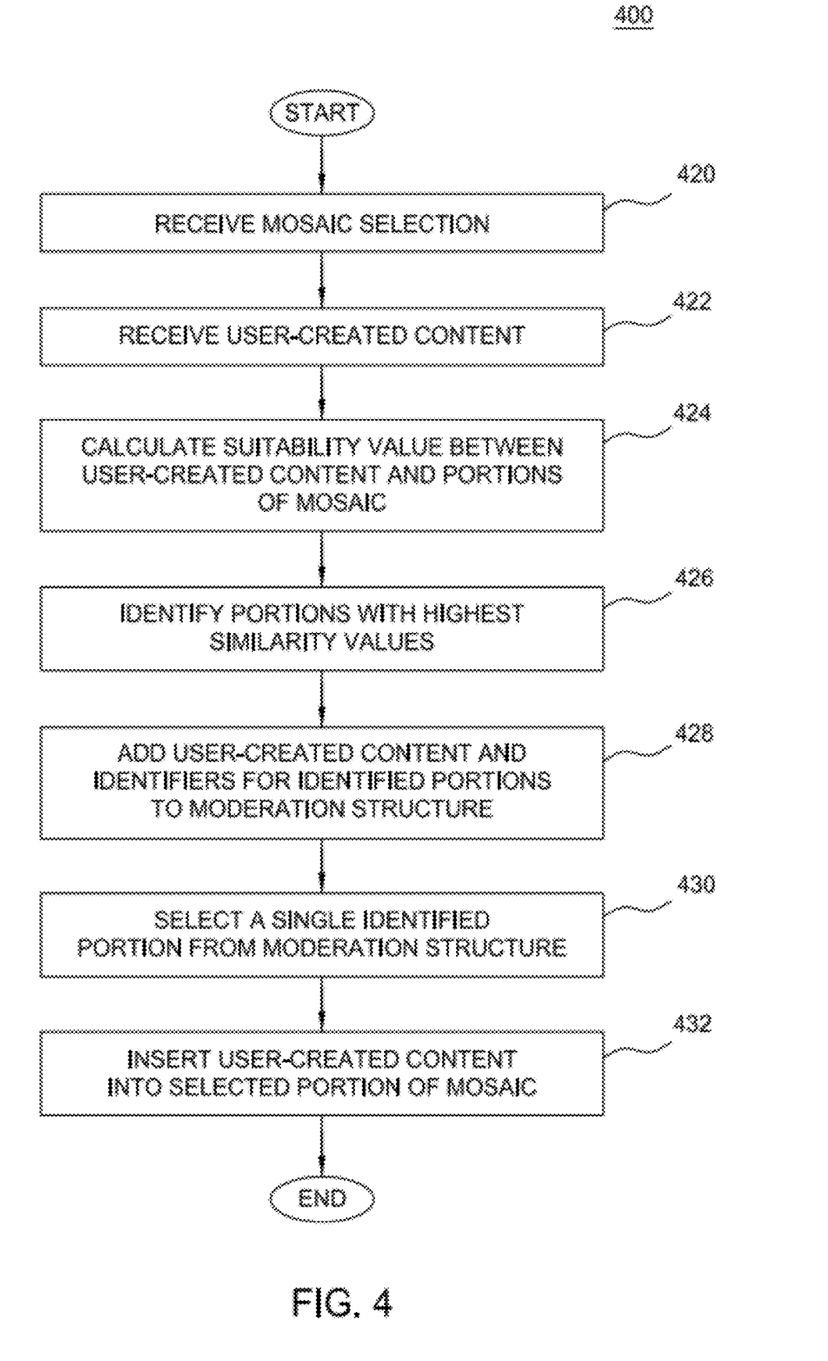
FIG. 4 is a flow diagram illustrating a method for creating a mosaic from user-created content, according to one embodiment of the present invention.

FIG. 4 is a flow diagram illustrating a method for creating a mosaic from user-created content, according to one embodiment of the present invention. As shown, the method 400 begins at step 420, where the mosaic creation component 170 receives a selection of a mosaic. In one embodiment of the invention, the mosaic creation component 170 maintains a plurality of mosaics, each associated with a particular reference image 174. In such a case, rather than receiving a selection of a mosaic, the mosaic creation component 170 may search across the available mosaics for the best fit for a particular user-created image. The mosaic creation component 170 then receives user-created content (step 422). The user-created content may be created, for example, using the content creation interface discussed above and shown in FIG. 3A. In addition, as discussed above, the initial canvas of the content creation interface may be modified in a way that increases a likelihood that content created using the canvas will be inserted into the mosaic. For example, the mosaic creation component 170 may modify a background color or shading of the initial canvas to more closely resemble a corresponding portion of a reference image associated with the mosaic.

Once the user-created content is received, the mosaic creation component 170 determines a suitability value between the user-created content and portions of the mosaic (step 424). In one embodiment, the suitability value indicates the similarity between the user-created image and a corresponding portion of the reference image associated with the mosaic. For instance, one indicia of suitability may be whether the user-created image and the corresponding portion of the reference image are generally the same color. Thus, for example, for a portion of the reference image that is generally red in color, a user-created image that is mostly red in color would have a higher suitability value (i.e., indicating it is more similar) than a user-created image that is mostly blue in color. In one embodiment, the mosaic creation component 170 determines the suitability value by calculating the Euclidean distance between a set of sampled points in the user-created image and the corresponding points of a reference image associated with the mosaic. Such a measure may be based on the color values (e.g., RGB values) obtained at each sampling points.

Additionally, the suitability value may take factors other than similarity into account. For example, one user-created image may be deeded more suitable than a second if the level of effort invested in creating the first is higher. Also, near-perfect matches in similarity may be assigned lower suitability values in order to give the end result a more pleasing visual appearance. That is, by inserting user-created content that is not necessarily a perfect match for a particular location in the mosaic, embodiments of the invention may create a more interesting visual appearance for the created mosaic.

Once the suitability value is calculated, the mosaic creation component 170 identifies the portions of the mosaic associated with the highest suitability values (step 426). In one embodiment, the mosaic creation component 170 is configured to identify only a single portion of the mosaic associated with the highest suitability value. In another embodiment, the mosaic creation component 170 is configured to identify a range of portions of the mosaic. For example, the mosaic creation component 170 may be configured to identify portions of the mosaic where the suitability value is in the top 5%. Other examples include, without limitation, identifying a fixed number of top portions (e.g., selecting the top 3 portions for each image) and selecting all portions having a suitability value in a particular range (e.g., where the suitability value is measured with a value of 1 to 100, all portions with a suitability value greater than 95).

The mosaic creation component 170 then adds the user-created content along with identifiers for the portions of the mosaic associated with the highest suitability values to a moderation structure for review by an editor (step 428). In one embodiment of the invention, the mosaic creation component 170 inserts the user-created image into the portion(s) of the mosaic associated with the highest suitability values. However, in the depicted embodiment, the mosaic creation component 170 does not immediately insert the user-created image into the identified portions of the mosaic. Rather, the mosaic creation component 170 identifies the portions having the highest suitability values for the user-created image and allows a moderator of the content creation site to pick which portion(s) of the mosaic represents the best position at which to insert the user-created image into the mosaic. Advantageously, by identifying portions having the highest suitability values but then allowing an editor to make the final determination as to which portion of the mosaic to insert the user-created image into, embodiments of the invention improve the appearance of the mosaic by allowing a human to make the final subjective determination as to which location for the user-created image is the most visually appealing.

In one embodiment, the mosaic creation component 170 is configured to tentatively place the user-created content into portions of the mosaic, based on the calculated suitability value. For instance, in an embodiment where the mosaic is built over a period of time, the mosaic creation component 170 may tentatively insert the user-created image associated with the highest suitability value (at that point in time) into a corresponding portion of the mosaic. However if, at a later point in time, the mosaic creation component 170 identifies a second user-created image (e.g., an image associated with a higher suitability value), the mosaic creation component 170 may replace the first user-created image in the portion of the mosaic with the second user-created image.

By doing this, the mosaic creation component 170 may improve the appearance of the mosaic over time by inserting content that better matches portions of the corresponding reference image into the mosaic. In one embodiment, the mosaic creation component 170 may replace images already inserted into the mosaic using other user-created images that have a suitability value in proximity (i.e., not necessarily a higher suitability value) to the tentatively inserted image. Such an embodiment may produce a more visually interesting mosaic, as the mosaic will appear to evolve over a period of time, as different user-created content is periodically inserted into the mosaic.

An editor of the content sharing site then selects a single identified portion of the mosaic from the moderation structure (step 430). Once the single identified portion is selected, the mosaic creation component 170 inserts the user-created content into the selected portion of the mosaic (step 432). Once the user-created content is inserted into the mosaic, the method 400 ends. Advantageously, by identifying portions of the mosaic based on a user-created image, the method 400 ensures that the user-created image will be included in a mosaic. By doing this, the method 400 rewards users for creating content on the content sharing site.

In an alternate embodiment of the invention, the mosaic creation component 170 is configured to search a pool of user-created images on the content sharing site to determine the best match (e.g., the highest suitability value) for a particular portion of the mosaic. Thus, rather than searching for the best portion to insert a particular image, the mosaic creation component 170 may search for the best image to insert into a particular portion. Although such an embodiment does not guarantee placement in the mosaic for every single user-created image, the embodiment may produce a higher-quality mosaic, as the mosaic creation component 170 may select only the user-created images that produce the best fit.

Additionally, in such an embodiment, the mosaic creation component 170 may place restrictions on how a particular user-created image may be inserted into a mosaic. For instance, the mosaic creation component 170 may restrict how often a particular user-created image is inserted into a single mosaic. For example, a particular reference image may include ten different portions that are mostly red in color. However, if a single user-created image is inserted into all ten of the corresponding portions of the mosaic, this may result in a less interesting mosaic due to the repetition of the single image. Thus, in this example, the mosaic creation component 170 may be configured to avoid inserting a particular user-created image into all ten of the corresponding portions of the mosaic, and may instead only insert the user-created image into two of the portions of the mosaic. In one embodiment, the mosaic creation component 170 is configured to limit the number of images per user that may appear in a single mosaic (or limit the number of times the same image can be used in a mosaic). Advantageously, this increases the number of images from other users will be included in the mosaic, and in turn increases the likelihood that a given user's image will be included in the mosaic.

Furthermore, the mosaic creation component 170 may be configured to limit how close together instances of the same user-created image may appear in a single mosaic. That is, it may be still be interesting for the same user-created image to appear in a mosaic multiple times, so long as the instances of the image are not close together. As such, the mosaic creation component 170 may be configured to prevent two instances of the same image from appearing in a mosaic within a certain distance of each other. Additionally, in one embodiment, the mosaic creation component 170 may be configured to prevent images by the same user from appearing in a mosaic within a certain distance of one another. In a particular embodiment, the mosaic creation component 170 is configured to insert content (e.g., images) into a mosaic, based on a proximity within the mosaic to other user-created content having the same title. Advantageously, doing so may result in a more interesting and visually appealing mosaic.

Figure 5:
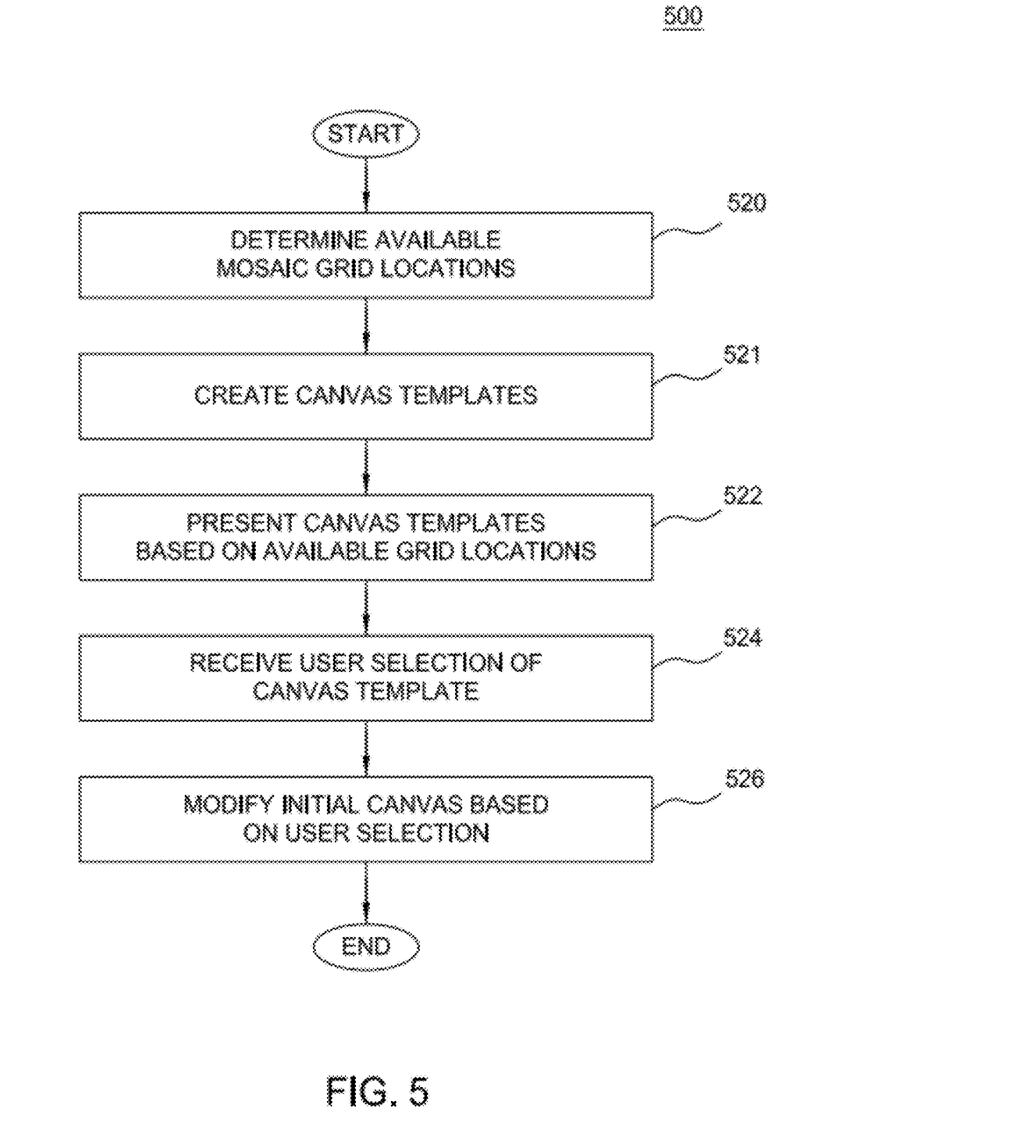
FIG. 5 is a flow diagram illustrating a method for providing a canvas for creating content optimized for acceptance into a mosaic, according to one embodiment of the present invention.

FIG. 5 is a flow diagram illustrating a method for providing a canvas for creating content optimized for acceptance into a mosaic, according to one embodiment of the present invention. As shown, the method 500 begins at step 520, where the mosaic creation component 170 determines a plurality of available grid locations in a mosaic. As discussed above, in one embodiment, the mosaic creation component 170 may allow the user to select a specific available portion of a mosaic (e.g., using the interface shown in FIG. 3B).

In any event, the mosaic creation component 170 then creates a canvas template for each of the available grid locations (step 521). Generally, a canvas template as used herein refers to an image representing a portion of a reference image. A canvas template may be used to modify an initial canvas of a content creation page so as to increase the likelihood that content created using the canvas will be inserted into the mosaic. As discussed above, the mosaic creation component 170 may modify the initial canvas by, for example, altering the background color of the canvas or inserting one or more background objects into the canvas.

The mosaic creation component 170 then presents a canvas template to the user for each of the determined available locations (step 522). In response to presenting the canvas choices to the user, the mosaic creation component 170 then receives a user selection of a particular canvas template (step 524). Once the user selection is received, the mosaic creation component 170 modifies the initial canvas for a content creation page based on the user selection (step 526). Advantageously, by altering general properties (e.g., the background color) of the initial canvas to more closely resemble the portion of the reference image associated with the available grid location, embodiments may reward users by increasing the likelihood that content created using the canvas will be inserted into the mosaic. Once the initial canvas is modified, the method 500 ends.

One further advantage is that by allowing users to select from a number of different canvas templates, the method 500 allows users to select the best fit for the image they wish to create, while still increasing the likelihood that the content created using the canvas will be inserted into the mosaic. For example, a particular user may wish to create an image showing the ocean. As such, the user may not wish the initial canvas to have a red background, even if such a background would increase the likelihood the image will be inserted into a mosaic. By allowing the user to select from a number of canvas templates, the method 500 may increase user satisfaction on the content sharing site.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for creating a mosaic based on a reference image, comprising:
   providing a first interface on a content sharing website that allows users to interactively create mosaic tiles for insertion into respective portions of a mosaic based on a thematic reference image;
   managing the interactive creation of a plurality of user-created tiles on the first interface, comprising, for each of the plurality of user-tiles:
      painting at least a portion of a respective initial canvas in a second interface using a respective background color prior to the respective user-created tile being interactively created to increase a likelihood that the respective user-created tile will be inserted into the mosaic, based on one or more available portions within the mosaic and a corresponding one or more portions of the thematic reference image; and generating the respective user-created tile by creating a customized image based on a plurality of user selections on the respective painted initial canvas in the second interface;

populating at least a portion of the mosaic with the plurality of user-created tiles created using the second interface, by operation of one or more computer processors, comprising:

determining a suitability value between each of the user-created tile in the plurality of user-created tiles and a corresponding portion of the thematic reference image; and inserting a particular user-created image into the portion of the mosaic based on the determined suitability value, based on at least one of (i) a first proximity in the mosaic to a first user-created image by a same author, (ii) a second proximity in the mosaic to a second user-created image with a same title, and (iii) an effort value calculated for the particular user-created content.

2. The computer-implemented method of claim 1, wherein the suitability value between the user-created tile and the corresponding portion of the thematic reference image is calculated using at least one Euclidean distance calculation.

3. The computer-implemented method of claim 1, wherein modifying an initial canvas further comprises:

determining a background color of a first portion of the one or more portions of the thematic reference image associated with a first available portion of the one or more available portions of the mosaic; and setting a background color of at least one portion of the initial canvas of the interface, based on the determined background color of the first portion.

4. The computer-implemented method of claim 3, wherein modifying an initial canvas further comprises:

determining at least one background shape in a first portion of the one or more portions of the thematic reference image associated with a first available portion of the one or more available portions of the mosaic; and inserting the determined at least one background shape into the initial canvas of the interface.

5. The computer-implemented method of claim 3, wherein modifying an initial canvas further comprises:

presenting a plurality of canvas templates on a third interface of the content sharing website, wherein each of the plurality of canvas templates is determined based on (i) a respective available portion of the mosaic and (ii) a corresponding portion of the thematic reference image; and receiving a selection of a canvas template from the user, wherein the initial canvas is modified based on the selected canvas template.

6. The computer-implemented method of claim 1, wherein inserting particular user-created image into the portion further comprises:

identify a plurality of potential user-created tiles to insert into the portion, based on the determined suitability value for each of the user-created tiles;

receiving a selection of a particular potential user-created tile from an editor of the content sharing website; and responsive to receiving the selection, inserting the particular potential user-created tile into the portion of the mosaic.

7. A non-transitory computer-readable medium containing a program that, when executed, performs an operation for creating a mosaic based on a reference image, the operation comprising:

providing a first interface on a content sharing website that allows users to interactively create mosaic tiles for insertion into respective portions of a mosaic based on a thematic reference image;

managing the interactive creation of a plurality of user-created tiles on the first interface, comprising, for each of the plurality of user-tiles:

painting at least a portion of a respective initial canvas in a second interface using a respective background color prior to the respective user-created tile being interactively created to increase a likelihood that the respective user-created tile will be inserted into the mosaic, based on one or more available portions within the mosaic and a corresponding one or more portions of the thematic reference image; and generating the respective user-created tile by creating a customized image based on a plurality of user selections on the respective painted initial canvas in the second interface;

populating at least a portion of the mosaic with the plurality of user-created tiles created using the second interface, by operation of one or more computer processors, comprising:

determining a suitability value between each of the user-created tile in the plurality of user-created tiles and a corresponding portion of the thematic reference image; and inserting a particular user-created image into the portion of the mosaic based on the determined suitability value, based on at least one of (i) a first proximity in the mosaic to a first user-created image by a same author, (ii) a second proximity in the mosaic to a second user-created image with a same title, and (iii) an effort value calculated for the particular user-created content.

8. The non-transitory computer-readable medium of claim 7, wherein the suitability value between the user-created tile and the corresponding portion of the thematic reference image is calculated using at least one Euclidean distance calculation.

9. The non-transitory computer-readable medium of claim 7, wherein modifying an initial canvas further comprises:

determining a background color of a first portion of the one or more portions of the thematic reference image associated with a first available portion of the one or more available portions of the mosaic; and setting a background color of at least one portion of the initial canvas of the interface, based on the determined background color of the first portion.

10. The non-transitory computer-readable medium of claim 7, wherein modifying an initial canvas further comprises:

determining at least one background shape in a first portion of the one or more portions of the thematic reference image associated with a first available portion of the one or more available portions of the mosaic; and inserting the determined at least one background shape into the initial canvas of the interface.

11. The non-transitory computer-readable medium of claim 7, wherein modifying an initial canvas further comprises:

presenting a plurality of canvas templates on a third interface of the content sharing website, wherein each of the plurality of canvas templates is determined based on (i) a respective available portion of the mosaic and (ii) a corresponding portion of the thematic reference image; and receiving a selection of a canvas template from the user, wherein the initial canvas is modified based on the selected canvas template.

12. The non-transitory computer-readable medium of claim 7, wherein inserting particular user-created image into the portion further comprises:

identify a plurality of potential user-created tiles to insert into the portion, based on the determined suitability value for each of the user-created tiles;

receiving a selection of a particular potential user-created tile from an editor of the content sharing website; and responsive to receiving the selection, inserting the particular potential user-created tile into the portion of the mosaic.

13. A system, comprising:

a computer processor; and a memory containing a program that, when executed on the computer processor, performs an operation for creating a mosaic based on a reference image, the operation comprising:

providing a first interface on a content sharing website that allows users to interactively create mosaic tiles for insertion into respective portions of a mosaic based on a thematic reference image;

managing the interactive creation of a plurality of user-created tiles on the first interface, comprising, for each of the plurality of user-tiles:

painting at least a portion of a respective initial canvas in a second interface using a respective background color prior to the respective user-created tile being interactively created to increase a likelihood that the respective user-created tile will be inserted into the mosaic, based on one or more available portions within the mosaic and a corresponding one or more portions of the thematic reference image; and generating the respective user-created tile by creating a customized image based on a plurality of user selections on the respective painted initial canvas in the second interface;

populating at least a portion of the mosaic with the plurality of user-created tiles created using the second interface, by operation of one or more computer processors, comprising:

determining a suitability value between each of the user-created tile in the plurality of user-created tiles and a corresponding portion of the thematic reference image; and inserting a particular user-created image into the portion of the mosaic based on the determined suitability value, based on at least one of (i) a first proximity in the mosaic to a first user-created image by a same author, (ii) a second proximity in the mosaic to a second user-created image with a same title, and (iii) an effort value calculated for the particular user-created content.

14. The system of claim 13, wherein the suitability value between the user-created tile and the corresponding portion of the thematic reference image is calculated using at least one Euclidean distance calculation.

15. The system of claim 13, wherein modifying an initial canvas further comprises:

determining a background color of a first portion of the one or more portions of the thematic reference image associated with a first available portion of the one or more available portions of the mosaic; and setting a background color of at least one portion of the initial canvas of the interface, based on the determined background color of the first portion.

16. The system of claim 13, wherein modifying an initial canvas further comprises:

determining at least one background shape in a first portion of the one or more portions of the thematic reference image associated with a first available portion of the one or more available portions of the mosaic; and inserting the determined at least one background shape into the initial canvas of the interface.

17. The system of claim 13, wherein modifying an initial canvas further comprises:

presenting a plurality of canvas templates on a third interface of the content sharing website, wherein each of the plurality of canvas templates is determined based on (i) a respective available portion of the mosaic and (ii) a corresponding portion of the thematic reference image; and receiving a selection of a canvas template from the user, wherein the initial canvas is modified based on the selected canvas template.

18. The system of claim 13, wherein inserting user-created image into the portion further comprises:

identify a plurality of potential user-created tiles to insert into the portion, based on the determined suitability value for each of the user-created tiles;

receiving a selection of a particular potential user-created tile from an editor of the content sharing website; and responsive to receiving the selection, inserting the particular potential user-created tile into the portion of the mosaic.

* * * * *